(12) United States Patent
Yamamoto et al.

(10) Patent No.: US 11,472,339 B2
(45) Date of Patent: Oct. 18, 2022

(54) VEHICLE PERIPHERY DISPLAY DEVICE

(71) Applicant: AISIN CORPORATION, Kariya (JP)

(72) Inventors: Kinji Yamamoto, Anjo (JP); Kazuya Watanabe, Anjo (JP); Takashi Hiramaki, Nagoya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 16/561,282

(22) Filed: Sep. 5, 2019

(65) Prior Publication Data
US 2020/0139888 A1 May 7, 2020

(30) Foreign Application Priority Data

Sep. 6, 2018 (JP) .............................. JP2018-167376

(51) Int. Cl.
*B60W 30/06* (2006.01)
*B60R 1/00* (2022.01)
*B60R 1/02* (2006.01)
*B60W 50/14* (2020.01)

(52) U.S. Cl.
CPC ............. *B60R 1/002* (2013.01); *B60W 30/06* (2013.01); *B60W 2050/146* (2013.01)

(58) Field of Classification Search
None
See application file for complete search history.

(56) References Cited

U.S. PATENT DOCUMENTS

| 7,161,616 | B1 | 1/2007 | Okamoto et al. |
| 2019/0073902 | A1* | 3/2019 | Indoh ....................... G08G 1/04 |
| 2019/0075268 | A1 | 3/2019 | Goto et al. |
| 2019/0174060 | A1* | 6/2019 | Oba ...................... H04N 5/3572 |
| 2019/0344828 | A1* | 11/2019 | Omori .................... B60W 50/14 |
| 2019/0355171 | A1* | 11/2019 | Ashley ..................... G06T 17/00 |
| 2020/0092521 | A1* | 3/2020 | Tsujino ..................... B60R 1/00 |

FOREIGN PATENT DOCUMENTS

| JP | 3300334 B2 | 7/2002 |
| JP | 5321267 B2 | 10/2013 |
| JP | 5872517 B2 | 3/2016 |
| JP | 2017-175182 A | 9/2017 |

* cited by examiner

*Primary Examiner* — Samuel D Fereja
(74) *Attorney, Agent, or Firm* — Sughrue Mion, PLLC

(57) ABSTRACT

A vehicle periphery display device includes: an image acquisition unit that acquires a captured image from an imaging unit that images a periphery of a vehicle; and a control unit that causes a display unit to display a three-dimensional image representing the vehicle and a periphery of the vehicle based on the captured image, from a viewpoint which is located on a side opposite to a candidate of a target parking position with respect to a position of the vehicle and which faces a far side of the candidate of the target parking position, in a case where the target parking position for parking the vehicle is set.

7 Claims, 10 Drawing Sheets

VEHICLE PERIPHERY DISPLAY DEVICE

CROSS REFERENCE TO RELATED APPLICATIONS

This application is based on and claims priority under 35 U.S.C. § 119 to Japanese Patent Application 2018-167376, filed on Sep. 6, 2018, the entire contents of which are incorporated herein by reference.

TECHNICAL FIELD

An embodiment of this disclosure relates to a vehicle periphery display device.

BACKGROUND DISCUSSION

A technology is developed that provides a driver with a situation of a periphery of a vehicle by displaying, on a display unit, a three-dimensional image of the vehicle and the periphery of the vehicle, in a case where a target parking position for parking the vehicle is set.

Examples of related art include Japanese Patent No. 5872517, Japanese Patent No. 3300334, and Japanese Patent No. 5321267.

However, in the technology that displays, on the display unit, a three-dimensional image of the vehicle and the periphery of the vehicle, the far side of the target parking position is not included in the three-dimensional image, and thus it is not possible to sufficiently provide the driver with a situation of the target parking position and it may be difficult for the driver of the vehicle to set the target parking position in some cases.

Thus, a need exists for a vehicle periphery display device which is not susceptible to the drawback mentioned above.

SUMMARY

A vehicle periphery display device according to an aspect of this disclosure includes, as an example, an image acquisition unit that acquires a captured image from an imaging unit that images a periphery of a vehicle; and a control unit that causes a display unit to display a three-dimensional image representing the vehicle and a periphery of the vehicle based on the captured image, from a viewpoint which is located on a side opposite to a candidate of a target parking position with respect to a position of the vehicle and which faces a far side of the candidate of the target parking position, in a case where the target parking position for parking the vehicle is set.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view illustrating an example of a state in which a part of a cabin of a vehicle equipped with a vehicle periphery display device according to this embodiment is seen through;

DETAILED DESCRIPTION

Hereinafter, an exemplary embodiment of this disclosure will be disclosed. A configuration of the embodiment, and an actions, a result, and an effect caused by the configuration, described below are just examples. This disclosure can be realized by a configuration other than the configuration disclosed in the following embodiment, and at least one from among various effects based on a basic configuration and derived effects can be obtained.

A vehicle on which a vehicle periphery display device according to this embodiment is mounted may be an automobile (an internal combustion engine automobile) driven by an internal combustion engine, or an automobile (an electric automobile, a fuel cell automobile, or the like) driven by an electric motor, or an automobile (a hybrid automobile) driven by both the internal combustion engine and the electric motor. In addition, the vehicle can be equipped with various transmission devices, and various devices (a system, a part, and the like) necessary for driving the internal combustion engine and the electric motor. In addition, types, the number, a layout, or the like of the devices related to driving wheels in the vehicle can be variously set.

Figure 1:
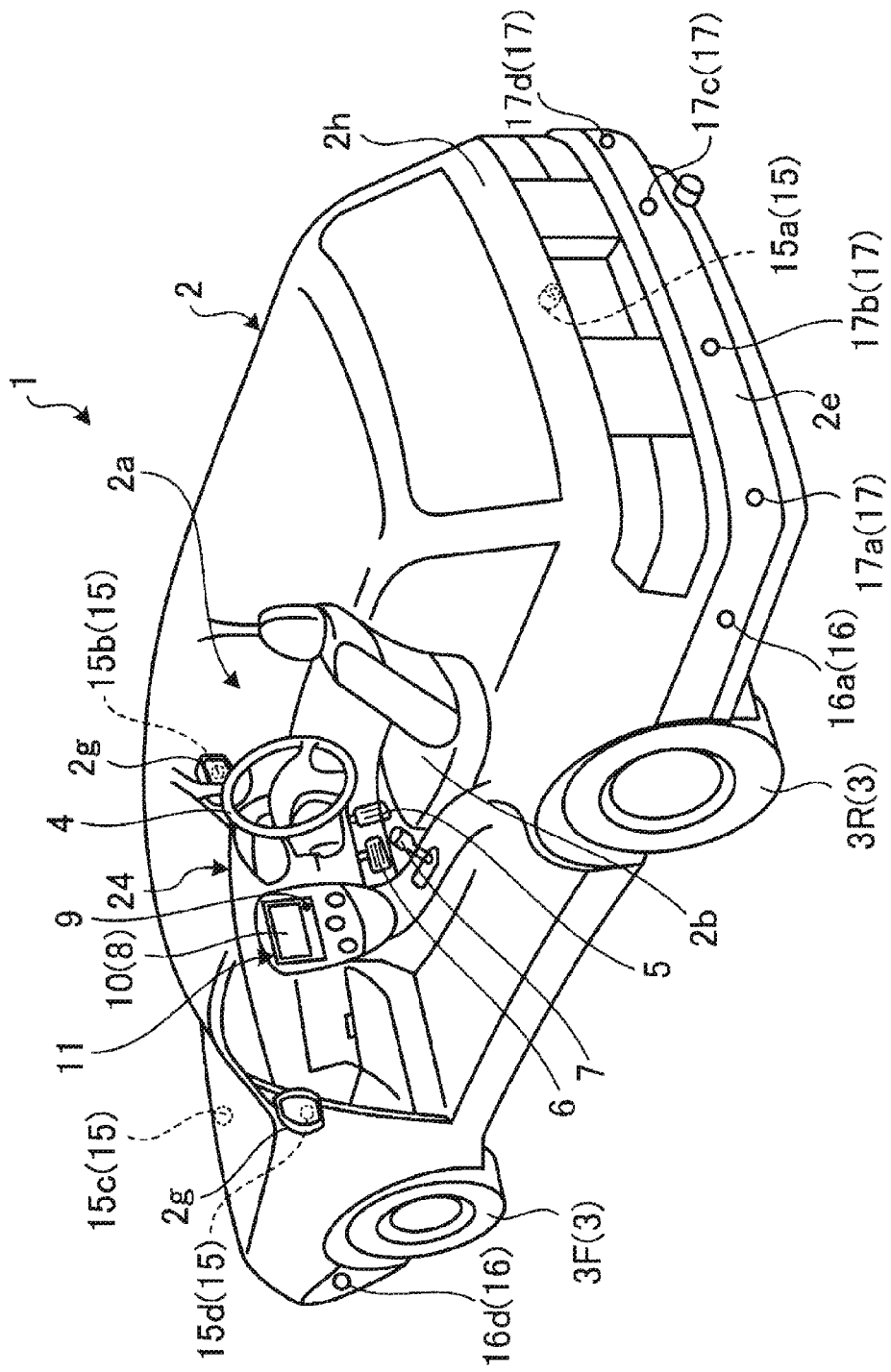

FIG. 1 is a perspective view illustrating an example of a state in which a part of a cabin of a vehicle equipped with a vehicle periphery display device according to this embodiment is seen through. As illustrated in FIG. 1, a vehicle 1 includes a vehicle body 2, a steering unit 4, an acceleration operation unit 5, a braking operation unit 6, a transmission shift operation unit 7, and a monitor device 11. The vehicle body 2 includes a cabin 2a in which an occupant is on board. In the cabin 2a, the steering unit 4, the acceleration operation unit 5, the braking operation unit 6, the transmission shift operation unit 7, and the like are provided in a state where a driver is seated on a seat 2b as the occupant. The steering unit 4 is, for example, a steering wheel protruding from a dashboard 24. The acceleration operation unit 5 is, for example, an accelerator pedal positioned under driver's feet. The braking operation unit 6 is, for example, a brake pedal positioned under the driver's feet. The transmission shift operation unit 7 is, for example, a shift lever protruding from a center console.

The monitor device 11 is provided, for example, at the center portion of the dashboard 24 in a vehicle width direction (that is, a lateral direction). The monitor device 11 may have, for example, a function of a navigation system, an audio system, or the like. The monitor device 11 includes a display device 8, an audio output device 9, and an operation input unit 10. The monitor device 11 may include various operation input units such as a switch, a dial, a joystick, and a pushbutton.

The display device 8 is configured to include a liquid crystal display (LCD), an organic electroluminescent display (OELD) and the like, and can display various images based on image data. The audio output device 9 is configured to include a speaker or the like, and outputs various audios based on audio data. The audio output device 9 may be provided at a position in the cabin 2a different from that of the monitor device 11.

The operation input unit 10 is configured to include a touch panel or the like, and makes it possible for the occupant to input various information items. In addition, the operation input unit 10 is provided on a display screen of the display device 8 and can transmit the image to be displayed on the display device 8. In this way, the operation input unit 10 makes it possible for the occupant to visually recognize the image displayed on the display screen of the display device 8. The operation input unit 10 receives an input of the various information items from the occupant by detecting a touch operation of the occupant on the display screen of the display device 8.

Figure 2:
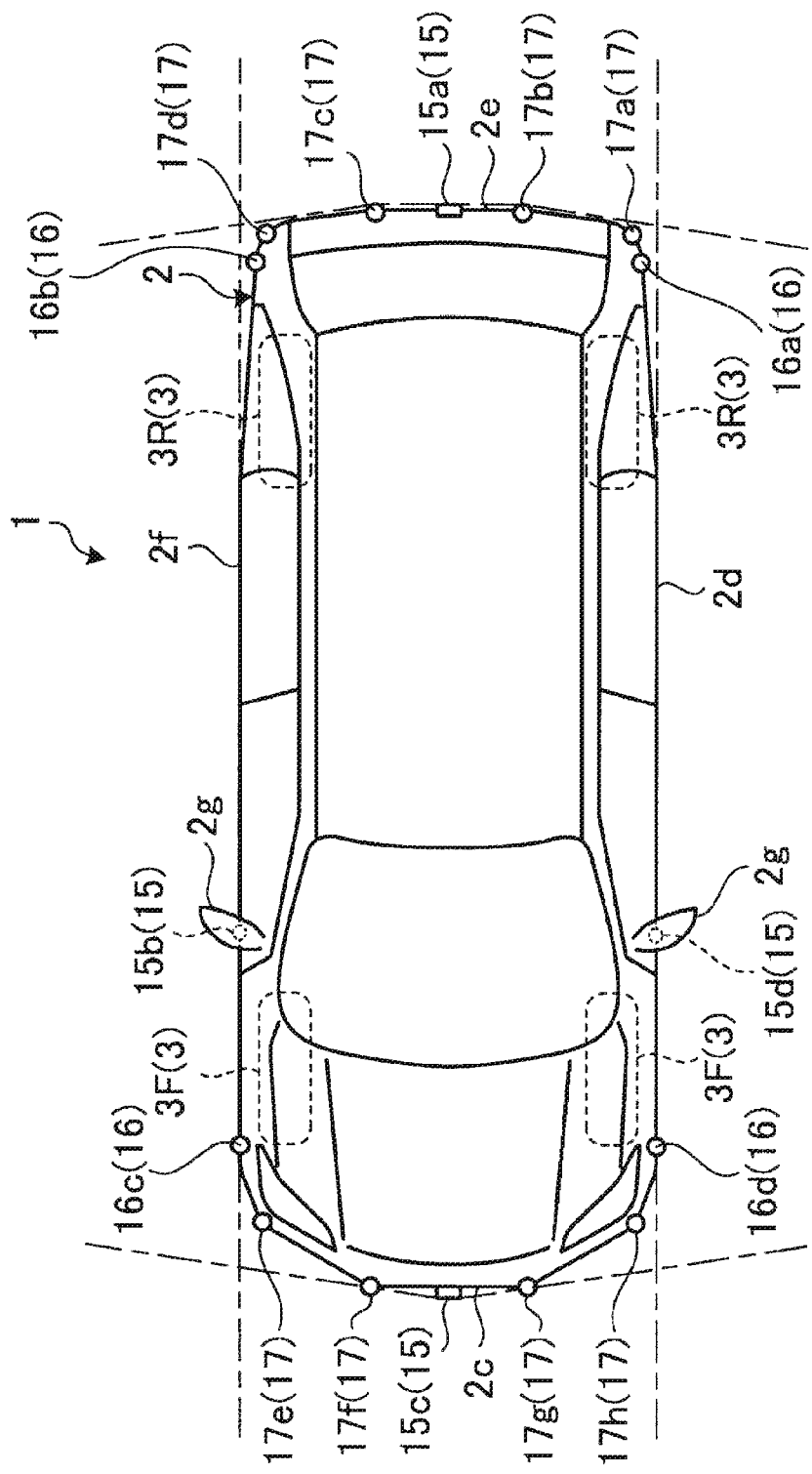
FIG. 2 is a plan view of an example of the vehicle according to this embodiment.

FIG. 2 is a plan view of an example of the vehicle according to this embodiment. As illustrated in FIGS. 1 and 2, the vehicle 1 is a four-wheeled vehicle or the like, and includes two left and right front wheels 3F and two left and right rear wheels 3R. All or a part of four wheels 3 can be steered.

The vehicle 1 is equipped with a plurality of imaging units 15 (an in-vehicle camera). In this embodiment, the vehicle 1 is equipped with, for example, four imaging units 15a to 15d. The imaging unit 15 is a digital camera including an image capturing device such as a charge coupled device (CCD) or a CMOS image sensor (CIS). The imaging unit 15 can image surroundings of the vehicle 1 at a predetermined frame rate. Then, the imaging unit 15 outputs a captured image obtained by imaging the surroundings of the vehicle 1. Each imaging unit 15 includes a wide-angle lens or a fish-eye lens and can capture an image, for example, in a range of 140° to 220° in the horizontal direction. In addition, in some cases, an optical axis of the imaging unit 15 may be set obliquely downward.

Specifically, the imaging unit 15a is positioned, for example, at an end portion 2e on a rear side of the vehicle body 2, and is provided on a wall portion of a rear hatch door 2h below a rear window. The imaging unit 15a can image an area behind the vehicle 1 among the surroundings of the vehicle 1. The imaging unit 15b is positioned, for example, at an end portion 2f on a right side of the vehicle body 2, and is provided on a right side door mirror 2g. The imaging unit 15b can image an area on a side of the vehicle 1 among the surroundings of the vehicle. The imaging unit 15c is positioned, for example, at an end portion 2c on a front side of the vehicle body 2, that is, on a front side of the vehicle 1 in a longitudinal direction, and is provided on a front bumper, a front grill, or the like. The imaging unit 15c can image an area in front of the vehicle 1 among the surroundings of the vehicle 1. The imaging unit 15d is positioned, for example, at the end portion 2d on a left side of the vehicle body 2, that is, on a left side of the vehicle in the vehicle width direction, and is provided on a left side door mirror 2g. The imaging unit 15d can image an area on the side of the vehicle 1 among the surroundings of the vehicle 1.

In addition, the vehicle 1 includes a radar 16 capable of measuring a distance to an object present outside the vehicle 1. The radar 16 is a millimeter wave radar or the like, and can measure a distance to an object present in a traveling direction of the vehicle 1. In this embodiment, the vehicle 1 includes a plurality of the radars 16a to 16d. The radar 16c is provided at an end portion on a right side of the front bumper of the vehicle 1 and can measure a distance to an object present in front of a right side of the vehicle 1. In addition, the radar 16d is provided at an end portion on a left side of the front bumper of the vehicle 1 and can measure a distance to an object present in front of the left side of the vehicle 1. The radar 16b is provided at an end portion on a right side of a rear bumper of the vehicle 1 and can measure a distance to an object present behind the right side of the vehicle 1. In addition, the radar 16a is provided at an end portion on a left side of the rear bumper of the vehicle 1 and can measure a distance to an object present behind the left side of the vehicle 1.

In addition, the vehicle 1 includes a sonar 17 capable of measuring a distance to an external object present at a short distance from the vehicle 1. In this embodiment, the vehicle 1 includes a plurality of the sonars 17a to 17h. The sonars 17e to 17h are provided at the front bumper of the vehicle 1, and can measure a distance to an object present in front of the vehicle. The sonars 17a to 17d are provided at the rear bumper of the vehicle 1, and can measure a distance to an object present behind the vehicle 1.

Figure 3:
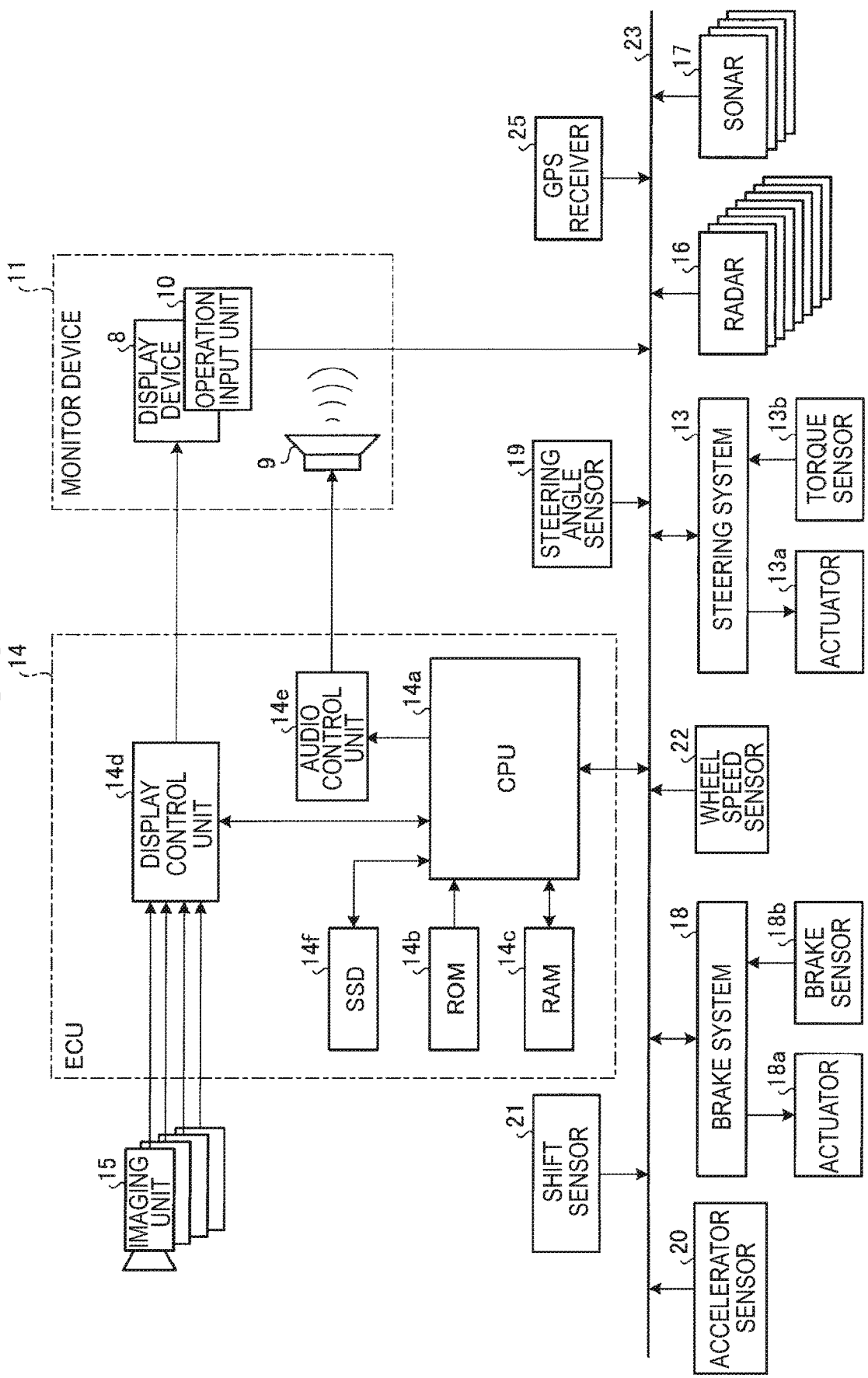
FIG. 3 is a block diagram illustrating an example of a functional configuration of the vehicle according to this embodiment.

FIG. 3 is a block diagram illustrating an example of a functional configuration of the vehicle according to this embodiment. As illustrated in FIG. 3, the vehicle 1 includes a steering system 13, a brake system 18, a steering angle sensor 19, an accelerator sensor 20, a shift sensor 21, a wheel speed sensor 22, a global positioning system (GPS) receiver 25, an in-vehicle network 23, and an electronic control unit (ECU) 14. The monitor device 11, the steering system 13, the radar 16, the sonar 17, the brake system 18, the steering angle sensor 19, the accelerator sensor 20, the shift sensor 21, the wheel speed sensor 22, the GPS receiver 25, and the ECU 14 are electrically connected to one another via the in-vehicle network 23 which is a telecommunication line. The in-vehicle network 23 is configured with a controller area network (CAN) or the like.

The steering system 13 is an electric power steering system, a steer by wire (SBW) system, or the like. The steering system 13 includes an actuator 13a and a torque sensor 13b. The steering system 13 is electrically controlled by the ECU 14 or the like, operates the actuator 13a, and steers the wheels 3 by adding torque to the steering unit 4 to supplement the steering force. The torque sensor 13b detects the torque applied by a driver to the steering unit 4, and transmits the result of detection to the ECU 14.

The brake system 18 includes an anti-lock brake system (ABS) that controls brake lock of the vehicle 1, a side slip prevention device (electronic stability control (ESC)) that suppresses side slip of the vehicle 1 during cornering, an electric brake system that assists a brake by increasing a brake force, and a brake by wire (BBW). The brake system 18 includes an actuator 18a and a brake sensor 18b. The brake system 18 is electrically controlled by the ECU 14 or the like, and applies the brake force to the wheels 3 via the actuator 18a. The brake system 18 detects the brake lock, an idling of the wheels 3, signs of side slip, or the like from a difference in rotation between the left and right wheels 3, or the like, and then, performs a control to suppress the brake lock, the idling of the wheels 3, and the side slip. The brake sensor 18b is a displacement sensor that detects a position of the brake pedal as a movable unit of the braking operation unit 6, and transmits the detection result of the position of the brake pedal to the ECU 14.

The steering angle sensor 19 is a sensor that detects a steering amount of the steering unit 4 such as a steering wheel. In this embodiment, the steering angle sensor 19 is configured with a Hall element or the like, detects, as a steering amount, a rotation angle (a steering angle) of a rotating portion of the steering unit 4 and then, transmits the detection result to the ECU 14. The accelerator sensor 20 is a displacement sensor that detects a position of the accelerator pedal as a movable unit of the acceleration operation unit 5, and transmits the detection result to the ECU 14. The GPS receiver 25 acquires a current position of the vehicle 1 based on a radio wave received from an artificial satellite.

The shift sensor 21 is a sensor that detects the position of the movable unit (a bar, an arm, a button, and the like) of the transmission shift operation unit 7, and transmits the detection result to the ECU 14. The wheel speed sensor 22 is a sensor that includes a Hall element or the like and detects a rotation amount of the wheels 3 and the number of rotations of the wheels 3 per a unit time, and transmits the detection result to the ECU 14.

The ECU 14 is configured with a computer or the like, and causes cooperation between hardware and software to perform overall management of controlling the vehicle 1. Specifically, the ECU 14 includes a central processing unit (CPU) 14a, a read only memory (ROM) 14b, a random access memory (RAM) 14c, a display control unit 14d, an audio control unit 14e, and a solid state drive (SSD) 14f. The CPU 14a, the ROM 14b, and the RAM 14c may be provided on the same circuit board.

The CPU 14a reads a program stored in a nonvolatile storage device such as the ROM 14b and performs various arithmetic processing items according to the program. For example, the CPU 14a performs image processing the image data to be displayed on the display device 8, control of traveling of the vehicle 1 according to a target route to a target position such as a parking position, and the like.

The ROM 14b stores various programs, parameters necessary for executing the programs, and the like. The RAM 14c temporarily stores various data items used in arithmetic performed by the CPU 14a. The display control unit 14d mainly performs, among the arithmetic processing items performed by the ECU 14, the image processing on the image data which is acquired from the imaging unit 15 and is output to the CPU 14a, conversion of the image data acquired from the CPU 14a into the image data for display to be displayed on the display device 8, and the like. The audio control unit 14e mainly performs, among the arithmetic processing items performed by the ECU 14, audio processing for acquiring the audio from the CPU 14a and outputting the audio to the audio output device 9. The SSD 14f is a rewritable nonvolatile storage unit, and continues to store the data acquired from the CPU 14a even in a case where a power source of the ECU 14 is turned off.

Figure 4:
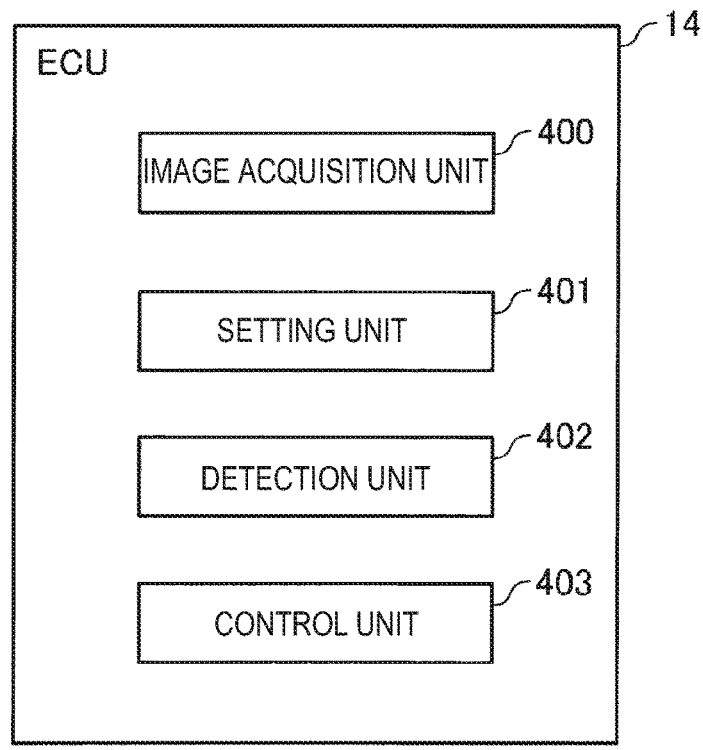
FIG. 4 is a block diagram illustrating an example of a functional configuration of an ECU included in the vehicle according to this embodiment.

FIG. 4 is a block diagram illustrating an example of a functional configuration of the ECU included in the vehicle according to this embodiment. As illustrated in FIG. 4, the ECU 14 includes an image acquisition unit 400, a setting unit 401, a detection unit 402, and a control unit 403. For example, the ECU 14 performs the functions of the image acquisition unit 400, the setting unit 401, the detection unit 402, and the control unit 403, by executing a vehicle periphery display program stored in a storage medium such as the ROM 14b or the SSD 14f using a processor such as the CPU 14a mounted on the circuit board. A part or all of the image acquisition unit 400, the setting unit 401, the detection unit 402, and the control unit 403 may be configured with hardware such as a circuit.

The image acquisition unit 400 acquires a captured image obtained by imaging the periphery of the vehicle 1 using the imaging unit 15. The setting unit 401 sets a target parking position and a viewpoint of a three-dimensional image based on the captured image acquired by the image acquisition unit 400 according to a user's operation via the operation input unit 10 or the like. Herein, the three-dimensional image is a three-dimensional image of the vehicle 1 and the periphery of the vehicle 1. In this embodiment, the setting unit 401 sets a viewpoint which is located on a side opposite to a candidate of the target parking position with respect to a position of the vehicle 1 and which faces the far side of the target parking position as the viewpoint of the three-dimensional image.

Herein, the target parking position is a position where the vehicle 1 is parked. Specifically, the setting unit 401 sets a viewpoint moved by panning or tilting according to the user's operation as a viewpoint of the three-dimensional image. Then, the setting unit 401 stores the set viewpoint in a memory such as the RAM 14c.

The detection unit 402 detects an object approaching the vehicle 1 or the target parking position. In this embodiment, the detection unit 402 detects the object approaching the vehicle 1 or the target parking position, based on the captured image acquired by the image acquisition unit 400, the distance measured by the radar 16 (the distance between the vehicle 1 and the object present at the surroundings of the vehicle 1), and the like.

For example, the detection unit 402 detects the object approaching the vehicle 1 or the target parking position by image processing (for example, optical flow) on the captured image acquired by the image acquisition unit 400. Alternatively, the detection unit 402 detects the object approaching the vehicle 1 or the target parking position, based on a change in the distance measured by the radar 16.

In this embodiment, the detection unit 402 detects the object approaching the vehicle 1 based on the captured image acquired by the image acquisition unit 400 or the measurement result of the distance by the radar 16. In a case of detecting an object present at a relatively short distance from the vehicle 1, it is also possible to detect the object approaching the vehicle 1 based on the measurement result of the distance by the sonar 17.

The control unit 403 displays, on the display device 8, a display screen on which a situation of a periphery of the vehicle 1 can be visually recognized.

First, display processing the display screen by the control unit 403 in a case where parking of the vehicle 1 is not performed at the target parking position is described.

In a case where the parking of the vehicle 1 is not performed at the target parking position, the control unit 403 causes the display device 8 to display a display screen including a bird's-eye view image of the vehicle 1 and the periphery thereof, and a captured image obtained by capturing an image in a traveling direction of the vehicle 1 using the imaging unit 15 among the captured image acquired by the image acquisition unit 400. Herein, the bird's-eye view image is an image of an entirety of the vehicle 1 and the periphery thereof viewed from a viewpoint immediately above the vehicle 1. In addition, the bird's-eye view image is an image of a part of the vehicle 1 such as a side surface of the vehicle 1 (or the entirety of the vehicle 1) and the periphery thereof viewed from a viewpoint immediately above the vehicle 1.

In this embodiment, the control unit 403 generates an image of the periphery of the vehicle 1 from a viewpoint immediately above the vehicle 1 based on the captured image acquired by the image acquisition unit 400. Next, the control unit 403 includes, in the display screen, an image obtained by superimposing the image in which the vehicle 1 is viewed from a viewpoint immediately above the vehicle on the generated image (for example, an image in a bitmap format, an image showing a three-dimensional shape of the vehicle 1 displayed by a plurality of polygons), as the bird's-eye view image.

Next, display processing the display screen by the control unit 403 in a case of setting the target parking position is described.

In a case of setting the target parking position, the control unit 403 causes the display device 8 to display a display screen including a three-dimensional image of the vehicle 1 and the periphery thereof. In other words, in a case of setting the target parking position, the control unit 403 causes the display device 8 to display a display screen including a vehicle image showing the vehicle 1 and a three-dimensional image representing the periphery of the vehicle 1. Herein, the three-dimensional image is a three-dimensional image in which the vehicle 1 and the periphery thereof are viewed from a viewpoint which is located on a side opposite side to the candidate of the target parking position with respect to the position of the vehicle 1 and which faces the far side of the target parking position. In this way, in a case of setting the target parking position, it is possible to display, on the display device 8, a three-dimensional image viewed from a viewpoint where an entirety of the candidate of the target parking position can be visually recognized, and thus the driver of the vehicle 1 can easily set the target parking position.

In this embodiment, the control unit 403 causes the display device 8 to display a display screen including a three-dimensional image instead of the captured image included in the display screen before setting the target parking position. That is, when the target parking position is set, the control unit 403 causes the display device 8 to display a display screen including a bird's-eye view image and a three-dimensional image.

In this embodiment, the control unit 403 reads a viewpoint set in advance by the setting unit 401 from a memory such as the RAM 14c. Then, the control unit 403 causes the display device 8 to display a three-dimensional image in which the vehicle 1 and the periphery thereof are viewed from the viewpoint set in advance by the setting unit 401. In this way, when the target parking position is set, a three-dimensional image of the vehicle 1 and the periphery thereof viewed from a user's favorite viewpoint is displayed without performing an operation to change a viewpoint from which the vehicle 1 and the periphery thereof are viewed, and thus it is possible to easily check a situation of a periphery of the target parking position from the user's favorite viewpoint.

In addition, when the three-dimensional image is displayed on the display device 8, the control unit 403 causes the display device 8 to display the three-dimensional image with an entirety of the three-dimensional image rotated such that a front of the vehicle 1 in the three-dimensional image is directed upward. In this way, it is possible to display, on the display device 8, a three-dimensional image in which a traveling state of the vehicle 1 is reflected without changing a viewing direction of the candidate of the target parking position and the object in the periphery thereof in the three-dimensional image, and thus it is possible to easily grasp a positional relationship between the vehicle 1 and the object in the periphery thereof from the three-dimensional image displayed on the display device 8.

In this embodiment, the control unit 403 determines a rotation angle for rotating the entirety of the three-dimensional image based on a steering angle of the steering unit 4 detected by the steering angle sensor 19. Then, the control unit 403 rotates the entirety of the three-dimensional image according to the determined rotation angle to display the image on the display device 8.

Specifically, the control unit 403 determines the steering angle detected by the steering angle sensor 19 as the rotation angle. Next, the control unit 403 causes the display device 8 to display a three-dimensional image obtained by rotating the entirety of the three-dimensional image by the determined rotation angle in a direction opposite to a direction in which the steering unit 4 is steered. In this way, regardless of a change in the traveling direction of the vehicle 1, the front of the vehicle 1 in the three-dimensional image displayed on the display device 8 can be directed upward, and thus it is possible to display, on the display device 8, a three-dimensional image in which the traveling state of the vehicle 1 is reflected without changing the viewing direction of the candidate of the target parking position and the object in the periphery thereof in the three-dimensional image.

In addition, in a case where the object approaching the vehicle 1 or the target parking position is detected by the detection unit 402, the control unit 403 causes the display device 8 to display a three-dimensional image at a viewing angle including the detected object. In this way, when the target parking position is set, more information on the vehicle 1 and the periphery of the target parking position can be provided to the driver of the vehicle 1.

For example, in a case of setting the target parking position, when another vehicle approaches from the rear of the vehicle 1, the control unit 403 causes the display device 8 to display a three-dimensional image at the viewing angle including the other vehicle. At that time, it is preferable that the control unit 403 changes only the viewing angle of the three-dimensional image without changing the viewpoint of the three-dimensional image. This makes possible to provide information on an entirety of the target parking position while causing the driver of the vehicle 1 to be aware of an object such as another vehicle approaching the vehicle 1.

In this embodiment, in a case where the object detected by the detection unit 402 is a moving object such as another vehicle approaching the vehicle 1, the control unit 403 changes the target parking position and the position of the vehicle 1 in the three-dimensional image when the viewing angle of the three-dimensional image dynamically changes according to the change in the distance between the vehicle 1 and the moving object, which is troublesome. Therefore, in a case where the object detected by the detection unit 402 is a moving object, the control unit 403 changes the viewing angle of the three-dimensional image at each time set in advance.

Next, display processing the bird's-eye view image by the control unit 403 in a case where an automatic parking control is started is described. Herein, the automatic parking control is control processing for parking the vehicle 1 at the target parking position by an automatic driving.

In a case where setting the target parking position is completed and the automatic parking control is started, the control unit 403 switches the bird's-eye view image included in the display screen to a bird's-eye view image from a viewpoint facing the vehicle 1 in an obliquely backward direction. In addition, in a case where the automatic parking control is started, the control unit 403 switches the three-dimensional image to the captured image obtained by capturing an image in the traveling direction of the vehicle 1 using the imaging unit 15. That is, in a case where the automatic parking control is started, the control unit 403 causes the display device 8 to display a display screen including a bird's-eye view image from a viewpoint facing the vehicle 1 in an obliquely backward direction and the captured image.

When the target parking position is set, since it is necessary to strictly grasp a sense of a distance between the vehicle 1 and the object in the surroundings thereof, it is suitable to include, in the display screen, a bird's-eye view image of the vehicle 1 and the periphery thereof viewed from a viewpoint immediately above the vehicle 1. On the other hand, when the automatic parking control is started, it is not necessary to strictly grasp the sense of a distance between the vehicle 1 and the object in the surroundings thereof.

Therefore, the control unit 403 switches the bird's-eye view image included in the display screen to the bird's-eye view image from the viewpoint facing the vehicle 1 in the obliquely backward direction. In this way, the driver of the vehicle 1 can monitor the automatic parking control of the vehicle 1 using the bird's-eye view image with a three-dimensional effect. In addition, by switching to the bird's-eye view image from the viewpoint facing the vehicle 1 in the obliquely backward direction, it is possible to suppress distortion of a three-dimensional object included in the bird's-eye view image. In this embodiment, when the automatic parking control is started, the control unit 403 switches the bird's-eye view image included in the display screen to a bird's-eye view image from a viewpoint facing the vehicle 1 in an obliquely backward direction.

In this embodiment, the control unit 403 switches the bird's-eye view image included in the display screen to a bird's-eye view image from a viewpoint which is inclined by a predetermined angle from the viewpoint immediately above the vehicle 1. Herein, the predetermined angle is an angle set in advance. In this embodiment, the predetermined angle is an angle input by operating the operation input unit 10 or the like, and is stored in a memory such as the RAM 14c or the like. That is, a user can set a favorite predetermined angle. The control unit 403 switches the bird's-eye view image included in the display screen to a bird's-eye view image from a viewpoint which is inclined by the predetermined angle stored in the memory. In this way, the bird's-eye view image from the user's favorite viewpoint can be included in the display screen.

In addition, in case of manually parking the vehicle 1 at the target parking position (in case of not parking the vehicle 1 at the target parking position by the automatic parking control), it is possible for the control unit 403 to keep the bird's-eye view image included in the display screen as the bird's-eye view image in which the vehicle 1 and the periphery thereof are viewed from a viewpoint immediately above the vehicle 1 even after setting the target parking position is completed and the parking of the vehicle 1 at the target parking position is started. In this way, based on the presence or absence of the switching of the viewpoint of the bird's-eye view image included in the display screen, the driver of the vehicle 1 can easily recognize whether the parking of the vehicle 1 at the target parking position is performed manually or by the automatic parking control.

Next, display processing a three-dimensional image by the control unit 403 during execution of the automatic parking control is described.

After execution of the automatic parking control is started, the control unit 403 switches the viewpoint of the three-dimensional image included in the display screen depending on whether the vehicle 1 is moving forward or backward.

Specifically, in a case where the vehicle 1 is moving forward when the vehicle 1 is parked at the target parking position by the automatic parking control, the control unit 403 causes the display device 8 to display a display screen including a three-dimensional image from a viewpoint located behind the vehicle 1. On the other hand, in a case where the vehicle 1 is moving backward when the vehicle 1 is parked at the target parking position by the automatic parking control, the control unit 403 causes the display device 8 to display a display screen including a three-dimensional image from a viewpoint located in front of the vehicle 1.

In this way, the traveling direction of the vehicle 1 included in the three-dimensional image can be directed upward in the display screen, and a three-dimensional image with less distortion can be displayed when the vehicle 1 is viewed from an oblique viewpoint. As a result, it is possible to check a status that the vehicle 1 is parked at the target parking position by the automatic parking control, with a feeling of security using a three-dimensional image having reality.

In case of parking the vehicle 1 at the target parking position by the automatic parking control, the driver of the vehicle 1 does not steer the steering unit 4, so that a possibility to feel discomfort is low even if a left and a right of the three-dimensional image displayed on the display screen does not match with a left and a right of the actual vehicle 1 (that is, even if the front of the vehicle 1 in the three-dimensional image is not directed upward in the display screen). Therefore, in a case where the vehicle 1 is moving forward when the vehicle 1 is parked at the target parking position by the automatic parking control, the control unit 403 causes the display device 8 to display a display screen including a three-dimensional image from a viewpoint located behind the vehicle 1. On the other hand, in a case where the vehicle 1 is moving backward when the vehicle 1 is parked at the target parking position by the automatic parking control, the control unit causes the display device 8 to display a display screen including a three-dimensional image from a viewpoint located in front of the vehicle 1.

Accordingly, in case of manually parking the vehicle 1 at the target parking position, the driver of the vehicle 1 steers the steering unit 4, so that the left and the right of a horizontally reversed three-dimensional image displayed on the display screen which is installed on a front side of the vehicle 1 matches with the left and the right of the actual vehicle 1. In addition, it is preferable that the traveling direction of the vehicle 1 in the three-dimensional image is directed upward in the display screen. Therefore, in case of manually parking the vehicle 1 at the target parking position, the control unit 403 causes the display device 8 to display a display screen including a three-dimensional image from a viewpoint where the traveling direction of the vehicle 1 is directed upward in the display screen.

In addition, in a case where the parking of the vehicle 1 at the target parking position by the automatic driving control is completed, the control unit 403 rotates the viewpoint of the three-dimensional image included in the display screen by 360 degrees with the position of the vehicle 1 as a center. In this embodiment, in a case where the vehicle 1 is moved to the target parking position and the vehicle 1 is stopped by the automatic driving control unit, the control unit 403 determines that the parking of the vehicle 1 at the target parking position is completed, and rotates the viewpoint of the three-dimensional image included in the display screen by 360 degrees with a middle of a rear wheel shaft of the vehicle 1 as a center. In this way, it is possible to check the parking state of the vehicle 1 with respect to the target parking position from various viewpoints at the surroundings of the vehicle 1.

Next, generation processing the three-dimensional image included in the display screen by the control unit 403 is described.

The control unit 403 acquires a captured image obtained by imaging the surroundings of the vehicle 1 using the imaging unit 15. Next, the control unit 403 detects a target parking position included in the acquired captured image, and draws a frame of the target parking position on the captured image. Thereafter, the control unit 403 generates an image in which the captured image in which a frame of the target parking position is drawn is mapped as a texture on a bowl-shaped or cylindrical three-dimensional surface, as a three-dimensional image. Then, the control unit 403 includes the generated three-dimensional image on the display screen.

In case of drawing the frame of the target parking position on the three-dimensional image, the frame of the target parking position does not have coordinates in a height direction, and thus, disappears without being drawn on a rising section of the three-dimensional surface. In other words, in a case of drawing the frame of the target parking position on the three-dimensional image, the frame of the target parking position does not have coordinates in a height direction, and thus, is hidden below the three-dimensional surface. Although it is possible to display the frame of the target parking position without being hidden below the three-dimensional surface, in some cases, the frame is displayed at a position shifted from the target parking position in the captured image to be applied on the three-dimensional surface.

Although it is also possible to calculate three-dimensional coordinates of the frame of the target parking position which is drawn on the rising section of the three-dimensional surface, and to draw the frame of the target parking position at a position of the calculated three-dimensional coordinates on the three-dimensional surface, the three-dimensional coordinates of the frame of the target parking position on the three-dimensional surface have to be calculated whenever the target parking position changes. In addition, although it is possible to generate a lookup table of three-dimensional coordinates of the frame of the target parking position on the three-dimensional surface, it is necessary to generate the lookup table in advance.

Therefore, in this embodiment, the control unit 403 draws the frame of the target parking position on the captured image, and then, renders (applies) the captured image on which the frame of the target parking position is drawn on the three-dimensional surface. In this way, it is possible to generate a three-dimensional image including the frame of the target parking position without calculating three-dimensional coordinates of the frame of the target parking position on the three-dimensional surface or generating a lookup table, and thus, a display screen including a three-dimensional image including the frame of the target parking position can be easily displayed on the display device 8.

Next, specific examples of a display screen displayed on the display device 8 by the control unit 403 are described with reference to FIGS. 5 to 15.

Figure 5:
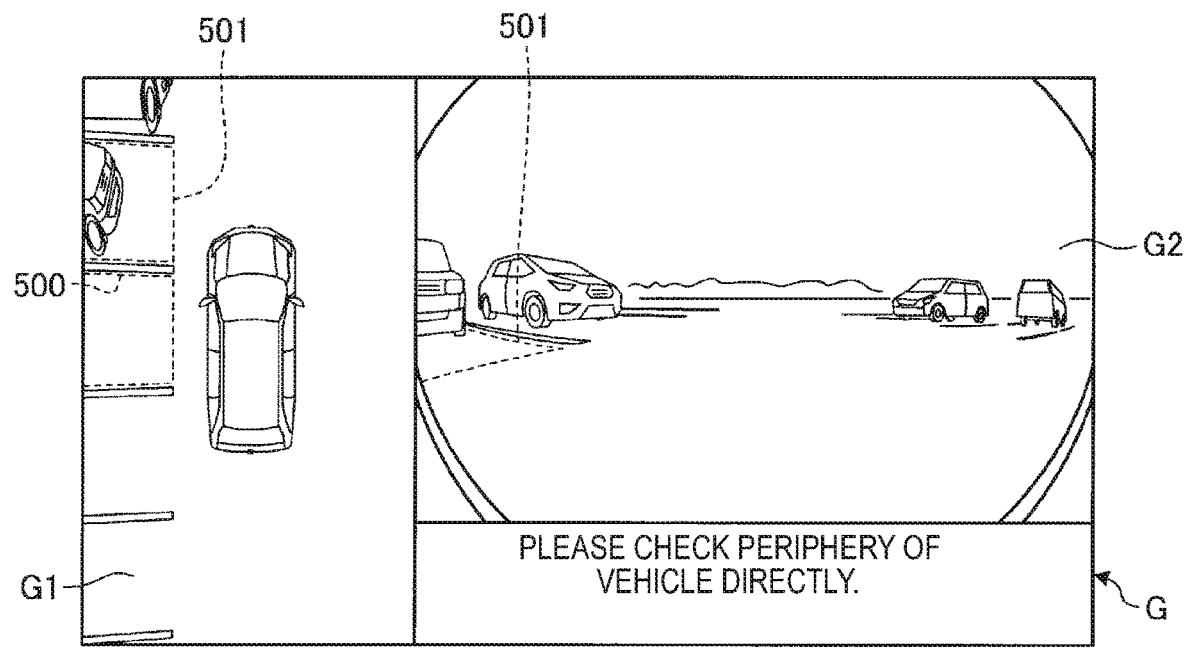
FIG. 5 is a view for explaining an example of display processing a display screen by the vehicle according to this embodiment.

FIG. 5 is a view for explaining an example of display processing a display screen by the vehicle according to this embodiment. In this embodiment, in a case where the parking of the vehicle 1 at the target parking position is not performed (in other words, before setting the target parking position), the control unit 403 causes the display device 8 to display a display screen G including a bird's-eye view image G1 of the entirety of the vehicle 1 and the periphery thereof, and a captured image G2 obtained by capturing an image in the traveling direction (for example, the front) of the vehicle 1 using the imaging unit 15, as shown in FIG. 5.

Since the bird's-eye view image G1 shown in FIG. 5 does not include an entirety of a parking position 501 adjacent to the candidate 500 of the target parking position, it is not possible to check whether or not another vehicle is parked at the parking position 501. In addition, since the bird's-eye view image G1 shown in FIG. 5 does not include the image of the far side of the candidate 500 of the target parking position, it is difficult to accurately determine whether or not the vehicle 1 can be parked at the candidate 500 of the target parking position.

In addition, from the captured image G2 shown in FIG. 5, it is possible to check that the other vehicle is parked at the parking position 501 adjacent to the candidate 500 of the target parking position. However, since the captured image G2 does not include the candidate 500 of the target parking position, it is difficult to grasp the positional relationship between the parking position 501 and the candidate 500 of the target parking position (for example, whether or not the parking position 501 is adjacent to the candidate 500 of the target parking position).

Figure 6:
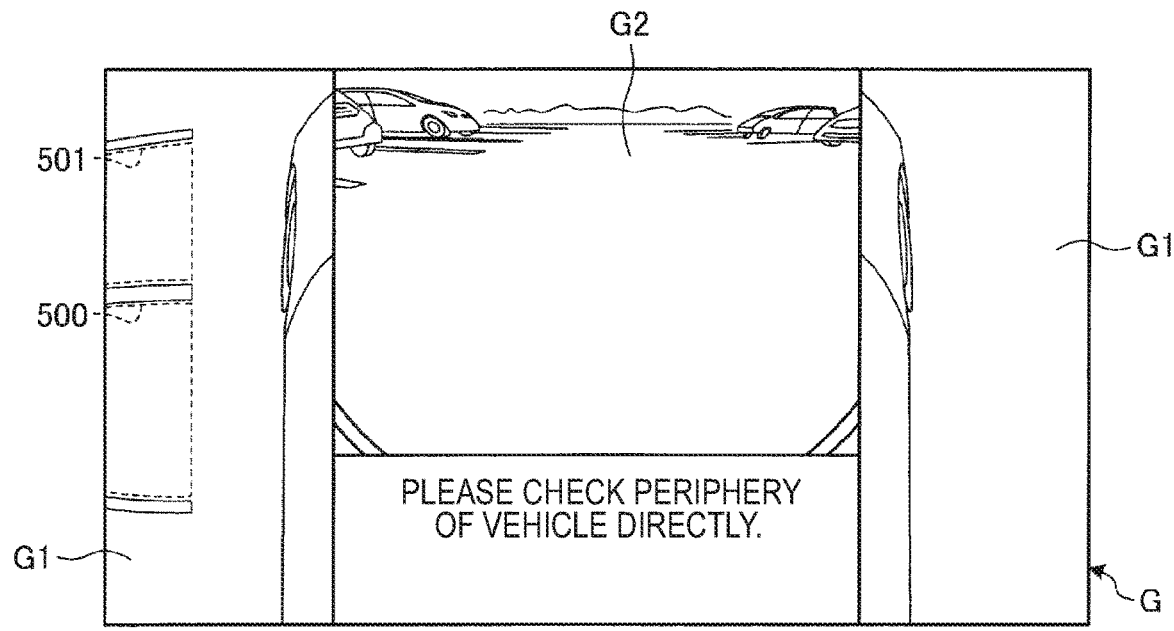
FIG. 6 is a view for explaining an example of display processing a display screen by the vehicle according to this embodiment.

FIG. 6 is a view for explaining an example of display processing a display screen by the vehicle according to this embodiment. In this embodiment, in a case where the parking of the vehicle 1 at the target parking position is not performed, the control unit 403 causes the display device 8 to display a display screen G including a bird's-eye view image G1 on the left side surface of the vehicle 1 and the periphery thereof, a bird's-eye view image G1 on the right side of the vehicle 1 and the periphery thereof, and a captured image G2 obtained by capturing an image in the traveling direction of the vehicle 1 using the imaging unit

15, as shown in FIG. 6. In this embodiment, the driver of the vehicle 1 can optionally switches, by operating the operation input unit 10, which one of the bird's-eye view image G1 of the entirety of the vehicle 1 and the periphery thereof, and the bird's-eye view image G1 of a part of the vehicle 1 (for example, the side) and the periphery thereof is included in the display screen G.

In the bird's-eye view image G1 shown in FIG. 6 (the bird's-eye view image on the left side of the vehicle 1 and the periphery thereof), the positional relationship with an object located near a side of the vehicle 1 is grasped easily, but it is not possible to check the entirety of the candidate 500 of the target parking position and the parking position 501. In this way, in the bird's-eye view image G1 of the vehicle 1 and the periphery thereof and the captured image G2 obtained by capturing an image in the traveling direction of the vehicle 1, it is not possible to check the entirety of the candidate 500 of the target parking position and the periphery thereof (for example, the parking position 501). Accordingly, the bird's-eye view image G1 and the captured image G2 as shown in each of FIGS. 5 and 6 may not be suitable for setting the target parking position.

Figure 7:
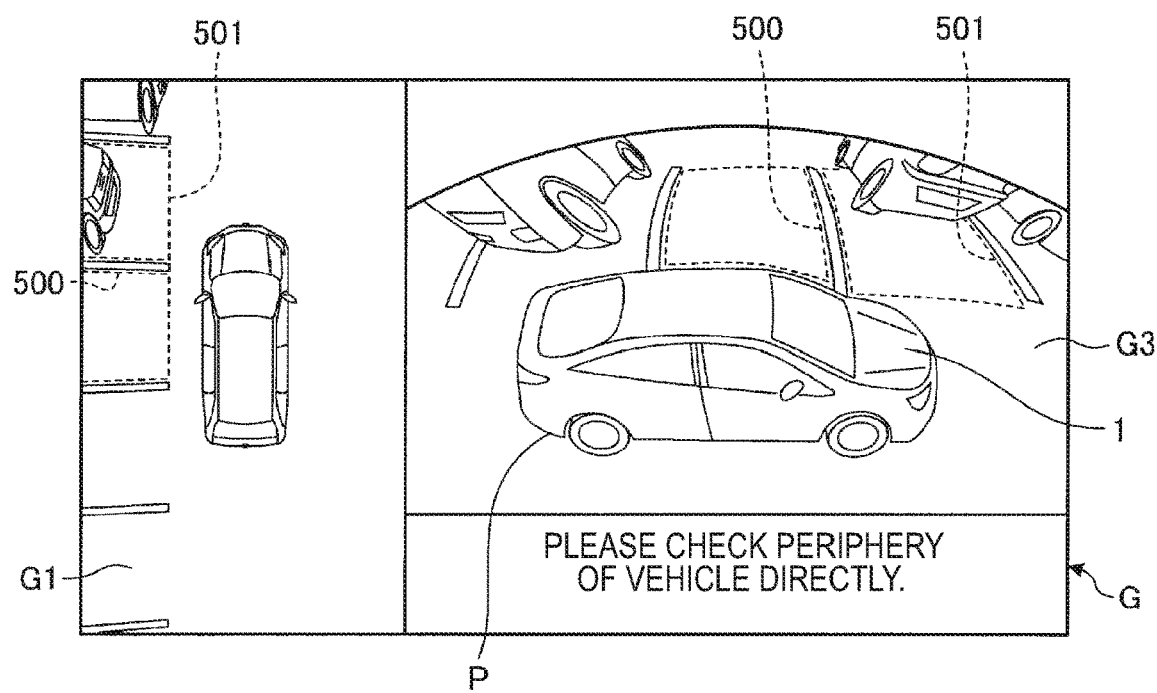
FIG. 7 is a view for explaining an example of display processing a display screen at the time of setting a target parking position by the vehicle according to this embodiment.

FIG. 7 is a view for explaining an example of display processing a display screen at the time of setting a target parking position by the vehicle according to this embodiment. When setting the target parking position is instructed via the operation input unit 10 or the like, the control unit 403 causes the display device 8 to display a display screen G including a bird's-eye view image G1 and a three-dimensional image G3, as shown in FIG. 7. In this embodiment, in case of setting the target parking position, the control unit 403 causes the display device 8 to display the display screen G including the bird's-eye view image G1 and the three-dimensional image G3, but it is sufficient that the control unit causes the display device 8 to display the display screen G including at least the three-dimensional image G3.

Herein, the three-dimensional image G3 is a three-dimensional image in which the vehicle 1 and the periphery thereof are viewed from the viewpoint which is located on a side opposite to the candidate 500 of the target parking position with respect to a position P of the vehicle 1 (the right side of the vehicle 1 in the three-dimensional image G3 shown in FIG. 7) and which faces the far side of the candidate 500 of the target parking position. In this way, in a case of setting the target parking position, it is possible to display, on the display device 8, the three-dimensional image G3 viewed from a viewpoint where the entirety of the candidate 500 of the target parking position and a situation of the periphery thereof (for example, the parking position 501) can be visually recognized.

As a result, it is possible to easily set the target parking position by the driver of the vehicle 1. In addition, since it is not necessary to widen a viewing angle of the three-dimensional image G3 in order to display, on the display device 8, the three-dimensional image G3 in which the entirety of the candidate 500 of the target parking position can be recognized visually, distortion of the image of the vehicle 1 or the like included in the three-dimensional image G3 due to enlargement of the viewing angle of the three-dimensional image G3 can be suppressed.

Figure 8:
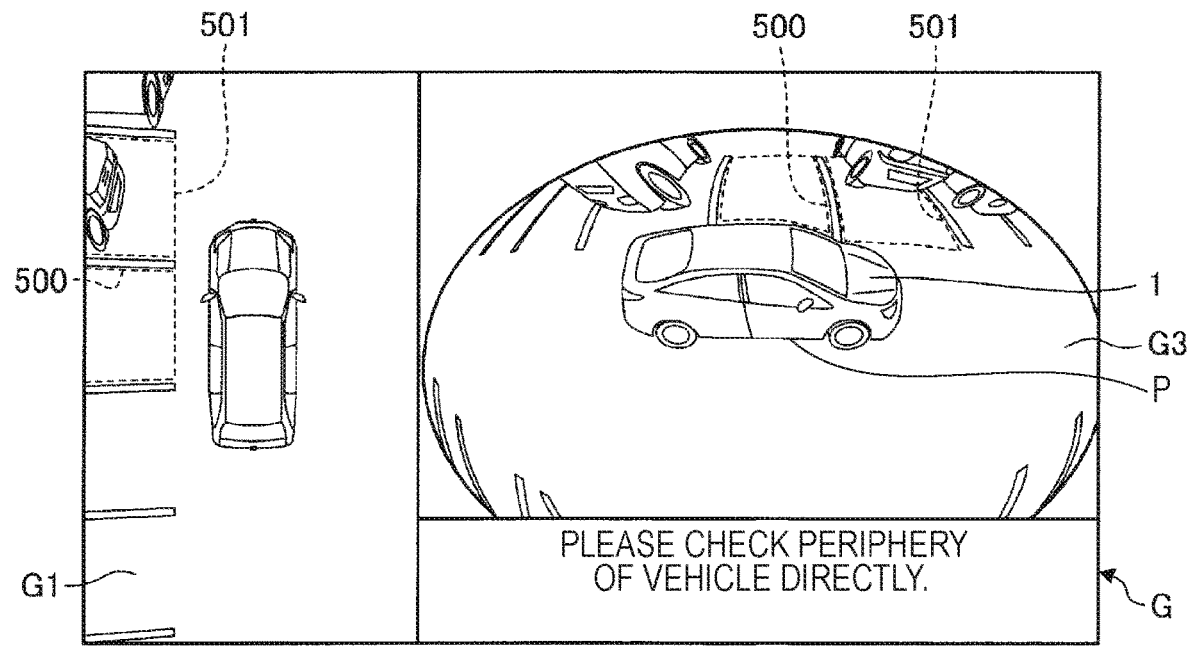
FIG. 8 is a view for explaining an example of display processing a three-dimensional image at the time of setting the target parking position by the vehicle according to this embodiment.

FIG. 8 is a view for explaining an example of display processing a three-dimensional image at the time of setting the target parking position by the vehicle according to this embodiment. In this embodiment, in a case where an object approaching the vehicle 1 is detected by the detection unit 402, the control unit 403 widens the viewing angle of the three-dimensional image G3, as shown in FIGS. 7 and 8. In this way, when setting the target parking position, information on an object (for example, another vehicle or a pedestrian) present at a position away from the vehicle 1 can be included in the three-dimensional image G3, and thus, it is possible to park the vehicle 1 at the target parking position with more safety.

Figure 9:
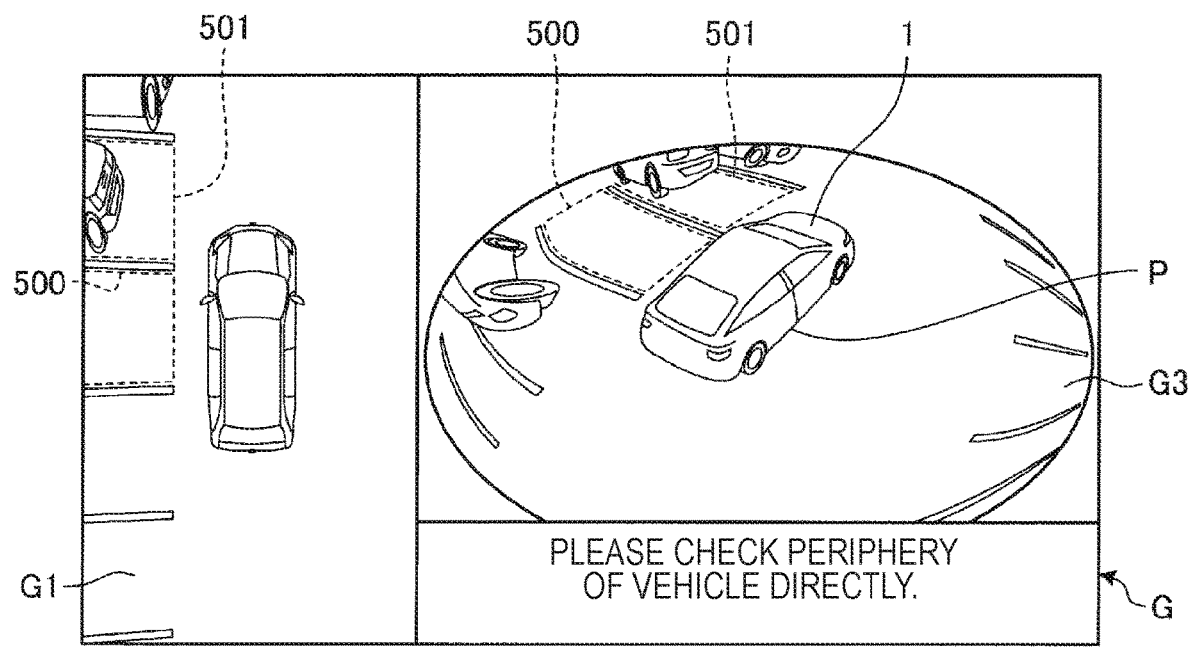
FIG. 9 is a view for explaining an example of display processing a three-dimensional image at the time of setting the target parking position by the vehicle according to this embodiment.

FIG. 9 is a view for explaining an example of display processing a three-dimensional image at the time of setting the target parking position by the vehicle according to this embodiment. In this embodiment, in a case where an object approaching the vehicle 1 from the rear thereof is detected by the detection unit 402, the control unit 403 widens the viewing angle of the three-dimensional image G3, as shown in FIG. 9. At that time, as shown in FIG. 9, the control unit 403 includes, in the display screen G, a three-dimensional image in which the vehicle 1 and the periphery thereof are viewed from the viewpoint behind the vehicle 1, as a three-dimensional image G3. In this way, it is possible to display the three-dimensional image G3 in which the positional relationship between the vehicle 1 and an object such as another vehicle approaching the vehicle 1 from behind is easily grasped.

Figure 10:
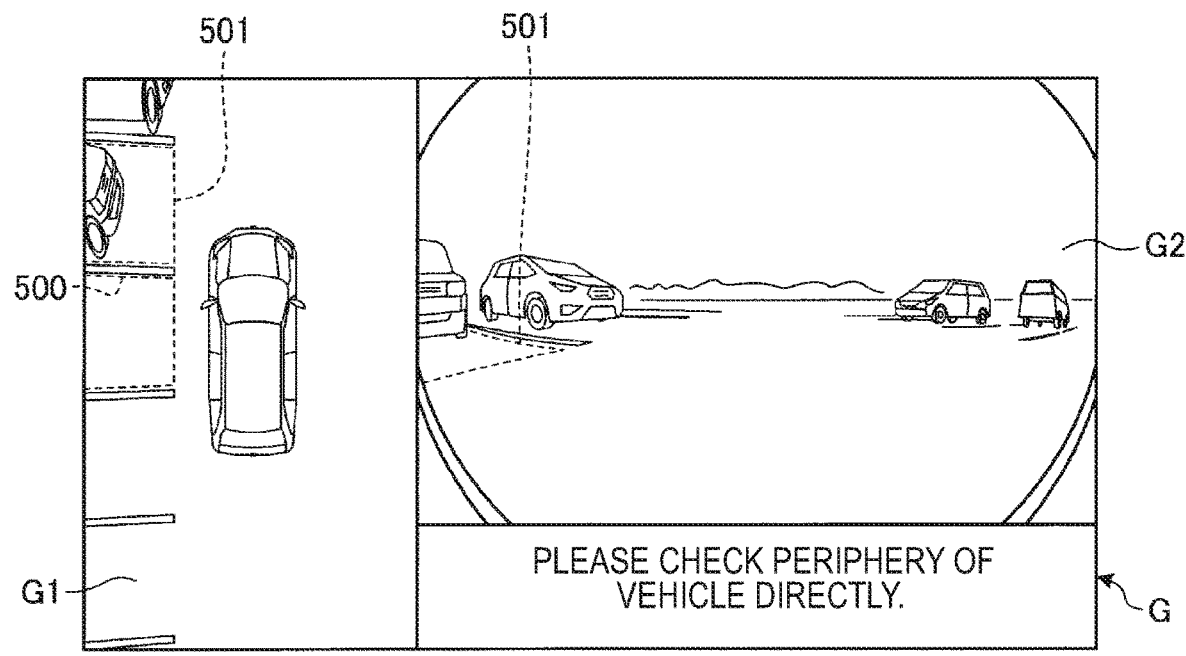
FIG. 10 is a view for explaining an example of display processing a bird's-eye view image at the start of an automatic parking control by the vehicle according to this embodiment.
Figure 11:
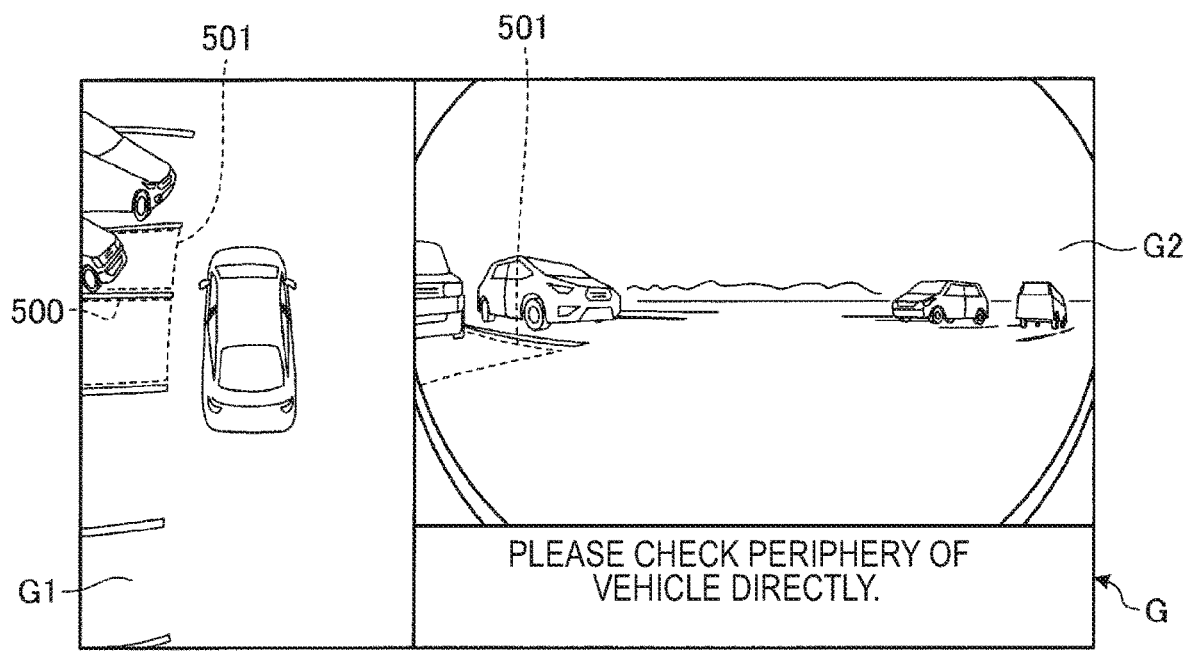
FIG. 11 is a view for explaining an example of display processing a bird's-eye view image at the start of the automatic parking control by the vehicle according to this embodiment.

FIGS. 10 and 11 are views for explaining examples of display processing bird's-eye view images at the start of an automatic parking control by the vehicle according to this embodiment. In this embodiment, in a case where the automatic parking control is started after the target parking position is set, the control unit 403 causes the display device 8 to display the display screen G including the bird's-eye view image G1 and the captured image G2, as shown FIG. 10.

At that time, the control unit 403 sets the bird's-eye view image G1 included in the display screen G, as a bird's-eye view image from a viewpoint where the vehicle 1 is viewed in an obliquely backward direction above the vehicle, as shown in FIG. 11. In this way, the driver of the vehicle 1 can monitor the automatic parking control of the vehicle 1 using the bird's-eye view image G1 with a three-dimensional effect. In addition, by switching the bird's-eye view image to the bird's-eye view image G1 from the viewpoint facing the vehicle 1 in the obliquely backward direction above the vehicle, it is possible to suppress the distortion of a three-dimensional object included in the bird's-eye view image G1.

In this embodiment, when the automatic parking control is started, the control unit 403 automatically causes the display device 8 to display a display screen G including the bird's-eye view image G1 from the viewpoint where the vehicle 1 is viewed in an obliquely backward direction above the vehicle and the captured image G2, but the control unit may switchably display the display screen G including the bird's-eye view image G1 in which the vehicle 1 is viewed from the viewpoint immediately above the vehicle or the bird's-eye view image G1 in which the vehicle 1 is viewed from the viewpoint in an obliquely backward direction above the vehicle, in response to an instruction input from the operation input unit 10 by a user.

In addition, in this embodiment, the control unit 403 causes the display screen G including the captured image G2 to be displayed instead of the three-dimensional image G3 when the automatic parking control is started, but the control unit may causes the display screen G including the three-dimensional image G3 to be displayed even when the automatic parking control is started.

For example, in case of displaying the display screen G including the bird's-eye view image G1 in which the vehicle 1 is viewed from the viewpoint immediately above the vehicle, the control unit 403 causes a display screen G including the bird's eye image G1 and the three-dimensional image G3 to be displayed. On the other hand, in case of displaying the display screen G including the bird's-eye view image G1 in which the vehicle 1 is viewed in an obliquely backward direction above the vehicle, the control unit 403 causes a display screen G including the bird's eye image G1 and the captured image G2 to be displayed.

Figure 12:
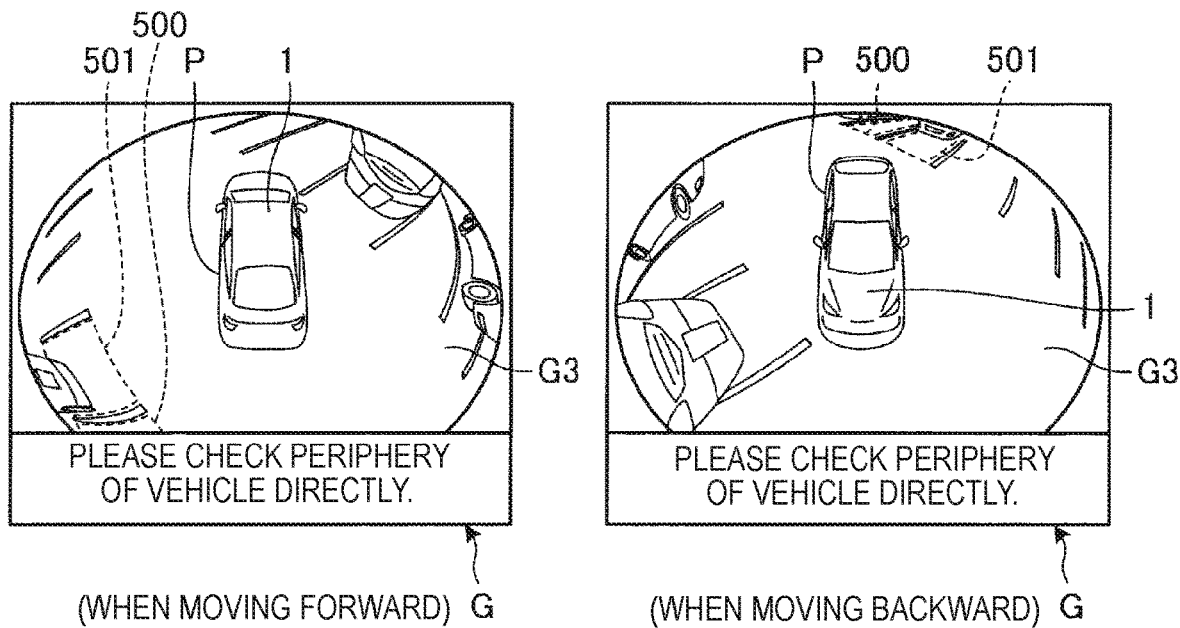
FIG. 12 is a view for explaining an example of display processing a three-dimensional image during executing the automatic parking control by the vehicle according to this embodiment.

FIG. 12 is a view for explaining an example of display processing a three-dimensional image during executing the automatic parking control by the vehicle according to this embodiment. In this embodiment, during executing the automatic parking control, the control unit 403 causes the display device 8 to display the display screen G including only the three-dimensional image G3. Meanwhile, in a case where the vehicle 1 is moving forward, the control unit 403 causes the display device 8 to display the display screen G including the three-dimensional image G3 in which the vehicle 1 and the periphery thereof are viewed from the viewpoint located behind the vehicle 1, as shown in FIG. 12.

In this way, a front side to which the vehicle 1 travels, in the three-dimensional image G3, can be directed upward in the display screen G, and a three-dimensional image G3 in which the vehicle 1 is viewed from an oblique viewpoint above the vehicle can be displayed with less distortion. As a result, it is possible to check a status that the vehicle 1 moves forward in a process of parking the vehicle 1 at the target parking position by the automatic parking control, with a feeling of security using a three-dimensional image having reality.

On the other hand, in a case where the vehicle 1 is moving backward during executing the automatic parking control, the control unit 403 causes the display device 8 to display the display screen G including the three-dimensional image G3 in which the vehicle 1 and the periphery thereof are viewed from the viewpoint located in front of the vehicle 1 as shown in FIG. 12.

In this way, a rear side to which the vehicle 1 travels, in the three-dimensional image G3, can be directed upward in the display screen G, and a three-dimensional image G3 in which the vehicle 1 is viewed from an oblique viewpoint above the vehicle can be displayed with less distortion. As a result, it is possible to check a status that the vehicle 1 moves backward in a process of parking the vehicle 1 at the target parking position by the automatic parking control, with a feeling of security using a three-dimensional image having reality.

In this embodiment, during executing the automatic parking control, the control unit 403 causes the display screen G including only the three-dimensional image G3 to be displayed, but it is not limited thereto as long as the control unit causes the display screen G including at least the three-dimensional image G3 to be displayed. For example, during executing the automatic parking control, the control unit 403 can display the display screen G including the bird's-eye view image G1 and the three-dimensional image G3.

Figure 13:
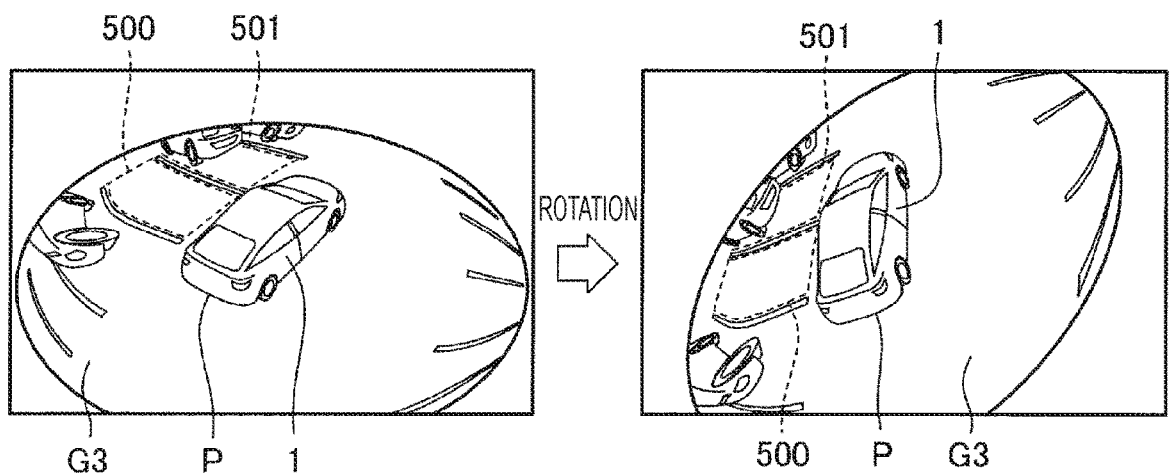
FIG. 13 is a view for explaining another example of display processing a three-dimensional image by the vehicle according to this embodiment.

FIG. 13 is a view for explaining another example of display processing a three-dimensional image by the vehicle according to this embodiment. In this embodiment, in a case where the automatic parking control is not executed (for example, in a case where the target parking position is set, in a case where the automatic parking control is started, or in a case where the parking is performed manually), the control unit 403 causes the display device 8 to display a display screen G including a three-dimensional image G3 obtained by rotating the entirety of the image so that the traveling direction of the vehicle 1 in the three-dimensional image G3 is directed upward, as shown in FIG. 13.

Specifically, the control unit 403 determines a rotation angle for rotating the entirety of the three-dimensional image G3 based on a steering angle detected by the steering angle sensor 19. For example, in a case where the steering angle sensor 19 detects a clockwise steering angle by the steering unit 4, the control unit 403 causes the display device 8 to display a display screen G including a three-dimensional image G3 obtained by counterclockwise rotating the entirety of the image by the detected steering angle, as shown in FIG. 13.

In this way, the control device can display, on the display device 8, the three-dimensional image G3 in which the traveling state of the vehicle 1 is reflected without changing a viewing direction of the candidate of the target parking position and an object in the periphery thereof in the three-dimensional image G3, and thus, it is possible to easily grasp a positional relationship between the vehicle 1 and the object in the periphery thereof from the three-dimensional image G3 displayed on the display device 8.

Figure 14:
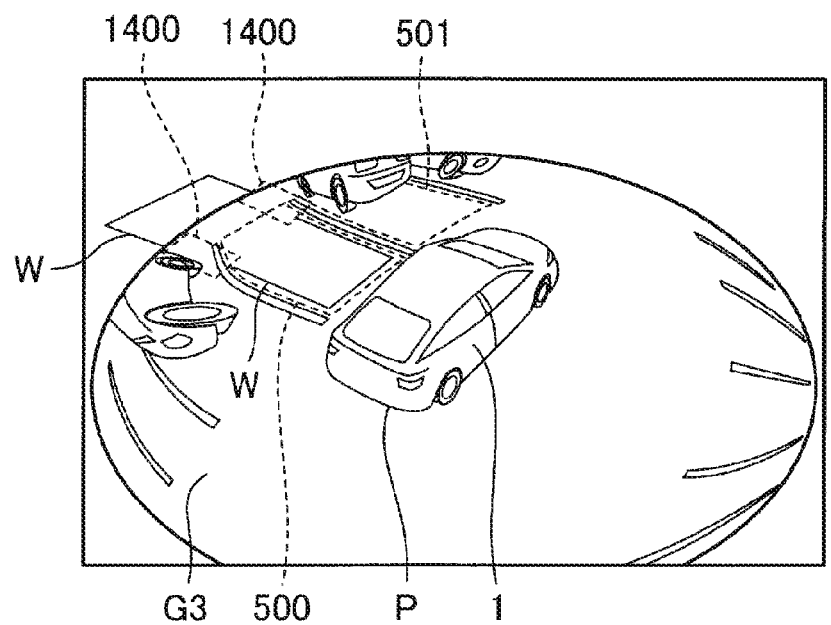
FIG. 14 is a view for explaining an example of generation processing a three-dimensional image.
Figure 14:
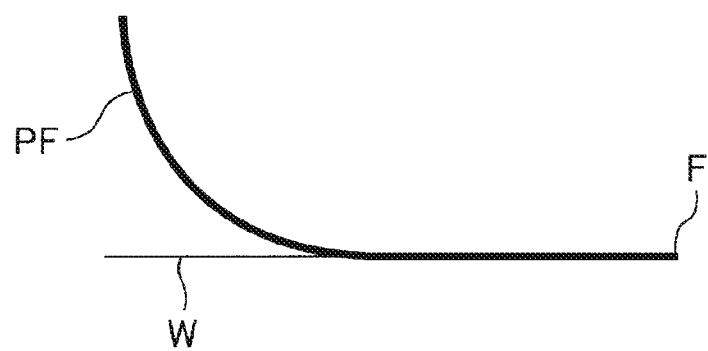

FIG. 14 is a view for explaining an example of generation processing a three-dimensional image. There is a method of generating a three-dimensional image G3 including a frame W of the target parking position by drawing the frame W of the target parking position on a three-dimensional image G3, after generating a three-dimensional image G3 in which a captured image obtained by imaging the periphery of the vehicle 1 using the imaging unit 15 is applied on a bowl-shaped three-dimensional surface F, as shown in FIG. 14.

However, in this method, the frame W of the target parking position does not have coordinates in a height direction, and thus, a part, to be drawn on a rising section PF of the three-dimensional surface F, in the frame W of the target parking position is hidden below the three-dimensional surface F, as shown in FIG. 14. Therefore, in a rising section 1400 of the three-dimensional image G3, the generated three-dimensional image G3 lacks a part of the frame W of the target parking position, as shown in FIG. 14.

Figure 15:
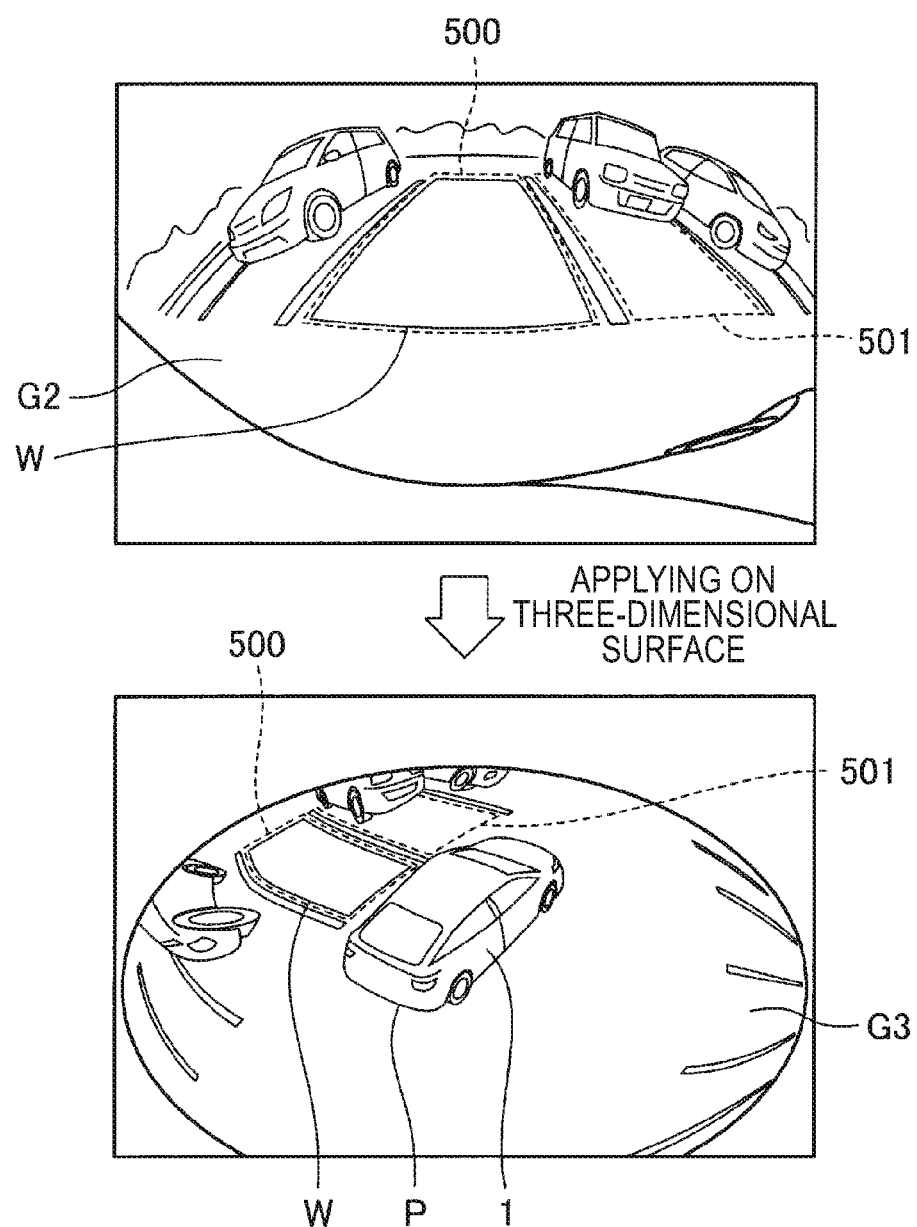
FIG. 15 is a view for explaining an example of generation processing a three-dimensional image by the vehicle according to this embodiment.

FIG. 15 is a view for explaining an example of generation processing a three-dimensional image by the vehicle according to this embodiment. In this embodiment, as shown in FIG. 15, the control unit 403 draws the frame W of the target parking position on a captured image G2 obtained by imaging the periphery of the vehicle 1 using the imaging unit 15, before applying the captured image G2 on the three-dimensional surface F. Thereafter, the control unit 403 generates an image in which the captured image G2 in which the frame W of the target parking position is drawn as a texture on a bowl-shaped three-dimensional surface F, as the three-dimensional image G3.

As a result, as shown in FIG. 15, it is possible to prevent the three-dimensional image G3 from lacking a part of the frame W of the target parking position due to a cause that the frame W included in the captured image G2 is hidden below the rising section PF of the three-dimensional surface F. At that time, it is possible to generate a three-dimensional image G3 including the frame W of the target parking position without calculating three-dimensional coordinates of the frame W of the target parking position on the three-dimensional surface F or generating a lookup table of the three-dimensional coordinates of the frame W of the target parking position on the three-dimensional surface F, and thus, a display screen G including a three-dimensional image G3 including the frame W of the target parking position can be easily displayed on the display device 8.

In this way, according to the vehicle 1 of this embodiment, in a case of setting the target parking position, it is possible to display, on the display unit, the three-dimensional image viewed from a viewpoint where an entirety of the candidate of the target parking position can be visually recognized, and thus, the driver of the vehicle can easily set the target parking position.

A vehicle periphery display device according to an aspect of this disclosure includes, as an example, an image acquisition unit that acquires a captured image from an imaging unit that images a periphery of a vehicle; and a control unit that causes a display unit to display a vehicle image representing the vehicle and a three-dimensional image representing a periphery of the vehicle based on the captured image, from a viewpoint which is located on a side opposite to a candidate of a target parking position with respect to a position of the vehicle and which faces a far side of the candidate of the target parking position, in a case where the target parking position for parking the vehicle is set. Therefore, as an example, in a case of setting the target parking position, it is possible to cause the display unit to display the three-dimensional image viewed from a viewpoint where an entirety of the candidate of the target parking position can be visually recognized, and thus the driver of the vehicle can easily set the target parking position.

In the vehicle periphery display device according to the aspect of this disclosure, as an example, the control unit may cause the display unit to display the three-dimensional image from a viewpoint which is located rearward of the vehicle in a case where the vehicle is moving forward when the vehicle is parked at the target parking position by an automatic parking control, and cause the display unit to display the three-dimensional image from a viewpoint which is located in front of the vehicle in a case where the vehicle is moving backward when the vehicle is parked at the target parking position by the automatic parking control. Therefore, as an example, it is possible to check a status that the vehicle is parked at the target parking position by the automatic parking control, with a feeling of security using a three-dimensional image having reality.

In the vehicle periphery display device according to the aspect of this disclosure, as an example, the control unit may further cause the display unit to display a bird's-eye view image of the vehicle and the periphery thereof viewed from a viewpoint above the vehicle, and cause the display unit to display a display screen including the bird's-eye view image from a viewpoint which faces the vehicle in an obliquely backward direction and a captured image which is obtained by capturing an image in a traveling direction of the vehicle using an imaging unit mounted on the vehicle, in a case where the automatic parking control is started. Therefore, as an example, the driver of the vehicle can monitor the automatic parking control of the vehicle by the bird's-eye view image with a three-dimensional effect.

In the vehicle periphery display device according to the aspect of this disclosure, as an example, the control unit may cause the display unit to display the three-dimensional image with an entirety of the three-dimensional image rotated such that a front of the vehicle in the three-dimensional image is directed upward. Therefore, as an example, it is possible to display, on the display unit, the three-dimensional image in which a traveling state of the vehicle is reflected without changing a viewing direction of the candidate of the target parking position and an object in the periphery thereof in the three-dimensional image, and thus it is possible to easily grasp a positional relationship between the vehicle and the object in the periphery thereof from the three-dimensional image displayed on the display unit.

In the vehicle periphery display device according to the aspect of this disclosure, as an example, the control unit may determine a rotation angle for rotating the entirety of the three-dimensional image based on a steering angle of a steering unit of the vehicle, and cause the display unit to display the three-dimensional image rotated according to the determined rotation angle. Therefore, as an example, regardless of a change in the traveling direction of the vehicle, the front of the vehicle in the three-dimensional image displayed on the display unit can be directed upward, and thus it is possible to display, on the display unit, the three-dimensional image in which the traveling state of the vehicle is reflected without changing the viewing direction of the candidate of the target parking position and the object in the periphery thereof in the three-dimensional image.

In the vehicle periphery display device according to the aspect of this disclosure, as an example, the control unit may cause the display unit to display the three-dimensional image at a viewing angle including an object approaching the vehicle or the target parking position, in a case where the object is detected. Therefore, as an example, when the target parking position is set, more information on the vehicle and periphery of the target parking position can be provided to the driver of the vehicle.

The vehicle periphery display device according to the aspect of this disclosure, as an example, may further include a setting unit that sets, according to a user's operation, a viewpoint which is located on the side opposite to the candidate of the target parking position with respect to the position of the vehicle and which faces the far side of the candidate of the target parking position, in which the control unit may cause the display unit to display the three-dimensional image from the set viewpoint, in a case where the target parking position is set. Therefore, as an example, when the target parking position is set, the three-dimensional image of the vehicle and the periphery thereof viewed from a user's favorite viewpoint is displayed without performing an operation to change a viewpoint from which the vehicle and the periphery thereof are viewed, and thus it is possible to easily check a situation of the periphery of the target parking position from the user's favorite viewpoint.

In the vehicle periphery display device according to the aspect of this disclosure, as an example, the control unit may draw a frame of the target parking position on a captured image which is obtained by imaging the periphery of the vehicle using the imaging unit, and cause the display unit to display an image in which the captured image in which the frame is drawn is mapped as a texture on a three-dimensional surface, as the three-dimensional image. Therefore, as an example, it is possible to generate a three-dimensional image including the frame of the target parking position without calculating three-dimensional coordinates of the frame of the target parking position on the three-dimensional surface or generating a lookup table, and thus the display screen including the three-dimensional image including the frame of the target parking position can be easily displayed on the display unit.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle periphery display device comprising:
    at least one processor configured to implement:
    an image acquisition unit that acquires a captured image from a camera that images a periphery of a vehicle; and
    a control unit that causes a display unit to display a three-dimensional image representing the vehicle and a periphery of the vehicle based on the captured image, from a viewpoint which is located on a side opposite to a candidate of a target parking position with respect to a position of the vehicle and which faces a far side of the candidate of the target parking position, at the timing of setting the target parking position for parking the vehicle and the all of vehicle is outside the target parking position,
    wherein the control unit causes the display unit to display the three-dimensional image from a viewpoint which is located rearward of the vehicle in a case where the vehicle is moving forward when the vehicle is parked at the target parking position by an automatic parking control, and causes the display unit to display the three-dimensional image from a viewpoint which is located in front of the vehicle in a case where the vehicle is moving backward when the vehicle is parked at the target parking position by the automatic parking control.

2. The vehicle periphery display device according to claim 1, wherein
    the control unit further causes the display unit to display a bird's-eye view image of the vehicle and the periphery thereof viewed from a viewpoint above the vehicle, and causes the display unit to display a display screen including the bird's-eye view image from a viewpoint which faces the vehicle in an obliquely backward direction and a captured image which is obtained by capturing an image in a traveling direction of the vehicle using a camera mounted on the vehicle, in a case where the automatic parking control is started.

3. The vehicle periphery display device according to claim 1, wherein
    the control unit causes the display unit to display the three-dimensional image with an entirety of the three-dimensional image rotated such that a front of the vehicle in the three-dimensional image is directed upward.

4. The vehicle periphery display device according to claim 3, wherein
    the control unit determines a rotation angle for rotating the entirety of the three-dimensional image based on a steering angle of a steering unit of the vehicle, and causes the display unit to display the three-dimensional image rotated according to the determined rotation angle.

5. The vehicle periphery display device according to claim 1, wherein
    the control unit causes the display unit to display the three-dimensional image at a viewing angle including an object approaching the vehicle or the target parking position, in a case where the object is detected.

6. The vehicle periphery display device according to claim 1, further comprising:
    a setting unit that sets, according to a user's operation, a viewpoint which is located on the side opposite to the candidate of the target parking position with respect to the position of the vehicle and which faces the far side of the candidate of the target parking position, wherein
    the control unit causes the display unit to display the three-dimensional image from the set viewpoint, in a case where the target parking position is set.

7. The vehicle periphery display device according to claim 1, wherein
    the control unit draws a frame of the target parking position on a captured image which is obtained by imaging the periphery of the vehicle using the camera, and causes the display unit to display an image in which the captured image in which the frame is drawn is mapped as a texture on a three-dimensional surface, as the three-dimensional image.

* * * * *